US010211742B2

(12) United States Patent
Vangala et al.

(10) Patent No.: US 10,211,742 B2
(45) Date of Patent: Feb. 19, 2019

(54) SOFT SWITCHING IN SINGLE SWITCH BOUNDARY CONDUCTION MODE FLYBACK CONVERTERS USING A FIXED DEAD TIME

(71) Applicants: Nagesh Vangala, Bangalore (IN); Rayudu Mannam, Bangalore (IN); Vignan's University, Guntur (IN)

(72) Inventors: Nagesh Vangala, Bangalore (IN); Rayudu Mannam, Bangalore (IN)

( * ) Notice: Subject to any disclaimer, the term of this patent is extended or adjusted under 35 U.S.C. 154(b) by 0 days.

(21) Appl. No.: 15/794,960

(22) Filed: Oct. 26, 2017

(65) Prior Publication Data
US 2018/0123442 A1    May 3, 2018

(30) Foreign Application Priority Data

Oct. 26, 2016 (IN) .............................. 201641036752

(51) Int. Cl.
*H02M 3/335* (2006.01)
*H02M 1/08* (2006.01)
*H02M 1/00* (2006.01)

(52) U.S. Cl.
CPC ....... *H02M 3/33507* (2013.01); *H02M 1/083* (2013.01); *H02M 2001/0058* (2013.01)

(58) Field of Classification Search
CPC .............. H02M 3/335–3/42; H02M 2001/0058
See application file for complete search history.

(56) References Cited

U.S. PATENT DOCUMENTS

| 4,754,385 A * | 6/1988 | McDade | H02M 3/3353 363/16 |
|---|---|---|---|
| 2009/0027930 A1* | 1/2009 | Usui | H02M 1/4225 363/84 |
| 2014/0334195 A1* | 11/2014 | Nussbaum | H02M 3/3376 363/21.04 |

OTHER PUBLICATIONS

J. Zhang, X. Huang, X. Wu and Z. Qian, "A High Efficiency Flyback Converter With New Active Clamp Technique," in IEEE Transactions on Power Electronics, vol. 25, No. 7, pp. 1775-1785, Jul. 2010.*

* cited by examiner

*Primary Examiner* — Gary L Laxton
*Assistant Examiner* — Peter Novak
(74) *Attorney, Agent, or Firm* — Mannava & Kang, P.C.; Vinay Malik

(57) ABSTRACT

Soft switching in Boundary Conduction Mode (BCM) flyback converters using a fixed dead time is presented. Embodiments disclosed herein relate to switching circuits and more particularly to soft switching in single stage isolated flyback converters with single switch. Embodiments herein disclose systems for soft switching in single stage isolated flyback converters by combining selection of transformers turn ratio and by incorporating the fixed dead time.

9 Claims, 3 Drawing Sheets

SOFT SWITCHING IN SINGLE SWITCH BOUNDARY CONDUCTION MODE FLYBACK CONVERTERS USING A FIXED DEAD TIME

CROSS REFERENCE TO RELATED APPLICATION

This application is based on and derives the benefit of Indian Provisional Application 201641036752, the contents of which are incorporated herein by reference.

TECHNICAL FIELD

Embodiments disclosed herein relate to switching circuits and more particularly to soft switching in flyback converters.

BACKGROUND

Flyback converter topology is the basic power conversion scheme for DC-DC and AC-DC isolated converters for high voltage and low output current requirements. Mostly these are limited to around 200 watts output power and multiple output requirements. However, in a normal flyback converter, the stresses on the components are higher due to parasitics associated with magnetics. A hard switched flyback converter invariably demands an RCD snubber to protect the main switching device, be it a metal-oxide-semiconductor field-effect transistor (MOSFET) or a bipolar transistor. This is mainly due to leakage inductance associated with the power transformer. MOSFET is widely used for high frequency applications in the range of 100 KHZ. In low input voltage applications, input currents drawn are fairly large. Switching losses increase with the operating frequency. Therefore, to achieve higher frequency, it is mandatory to adopt soft switching techniques. Soft switching mitigates the switching losses and hence allows high frequency operation.

Most of the existing soft switching techniques use an additional auxiliary switch and its drive control to achieve soft switching. Additional components and drive control are of a higher complexity and cost.

OBJECTS

The principal object of embodiments herein is to disclose systems for soft switching in single stage isolated flyback converters by operating the converter in boundary control mode and then by only incorporating a fixed dead time.

BRIEF DESCRIPTION OF FIGURES

Embodiments herein are illustrated in the accompanying drawings, through out which like reference letters indicate corresponding parts in the various figures. The embodiments herein will be better understood from the following description with reference to the drawings, in which.

DETAILED DESCRIPTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
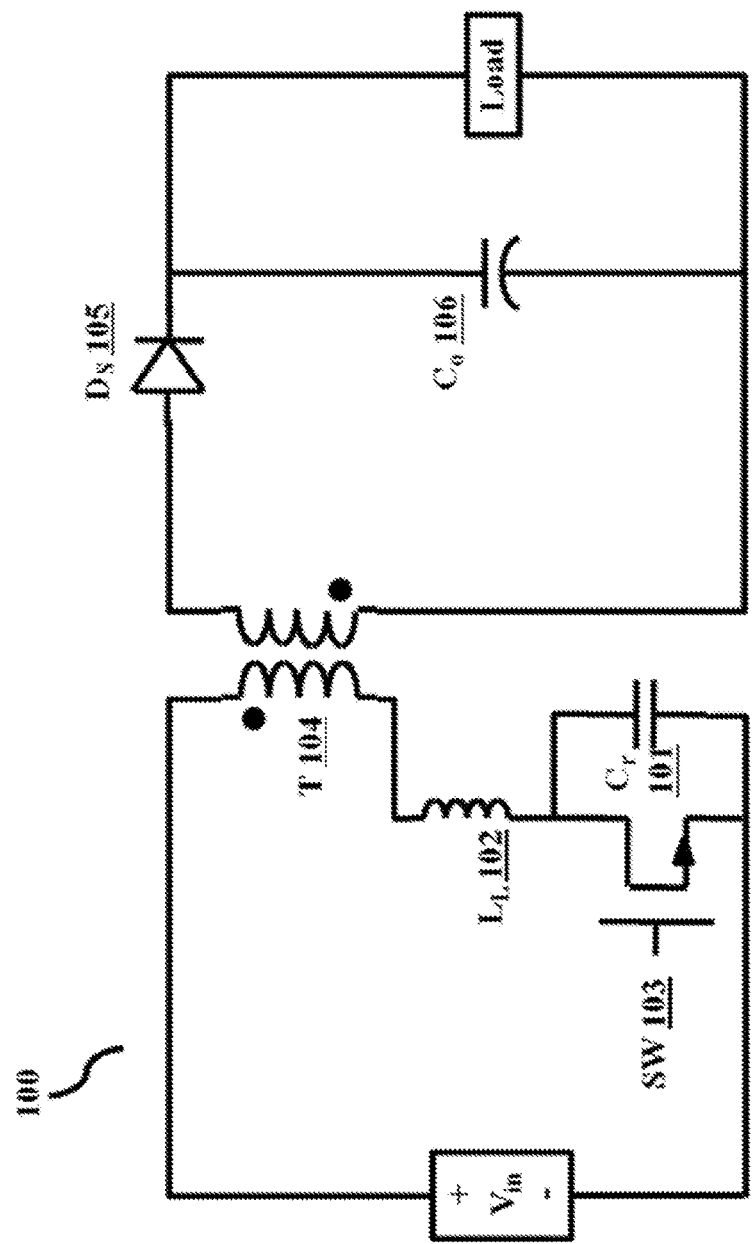
FIG. 1 depicts a flyback converter with an isolated low voltage output, according to embodiments as disclosed herein.
Figure 2:
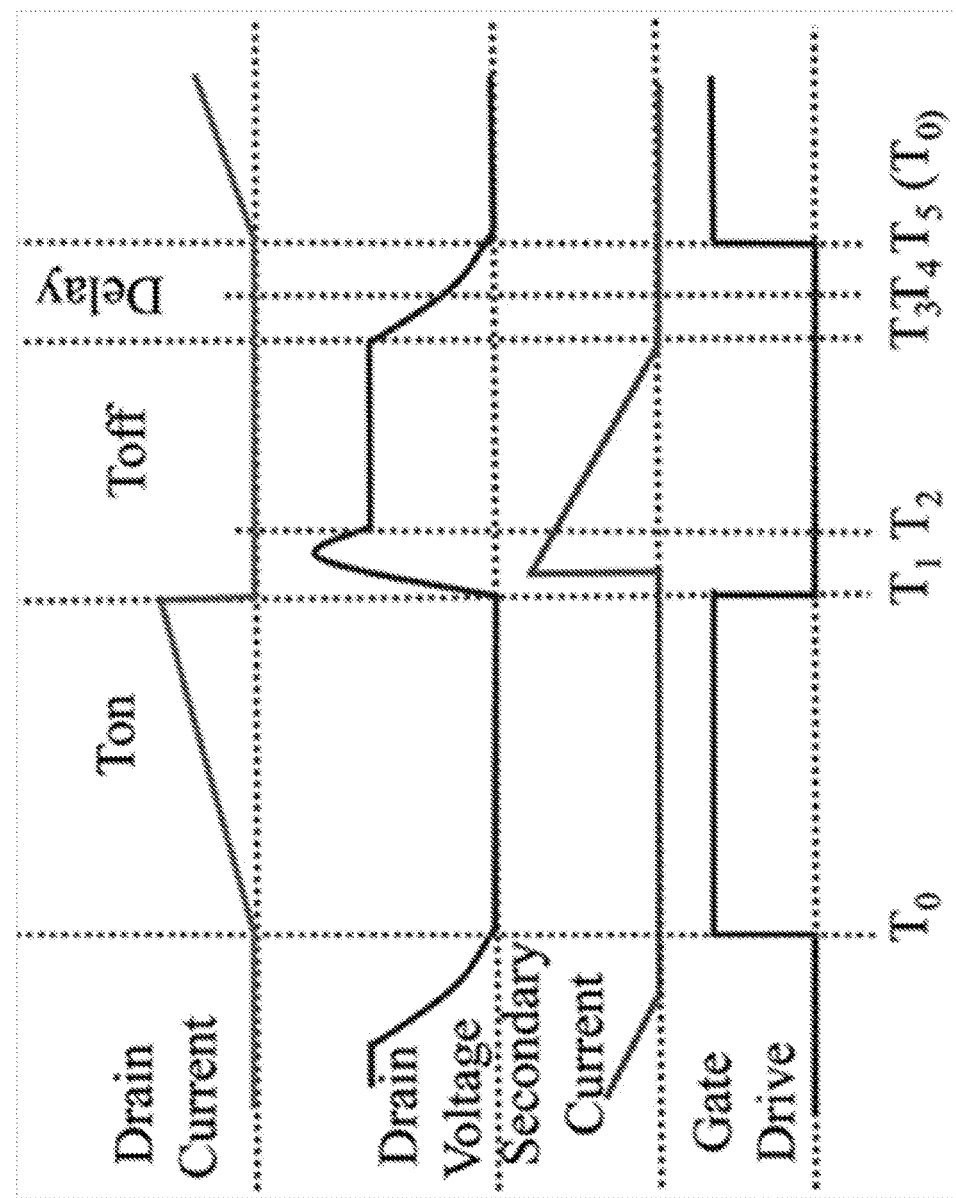
FIG. 2 depicts the timing sequence of the scheme, according to embodiments as disclosed herein.
Figure 3:
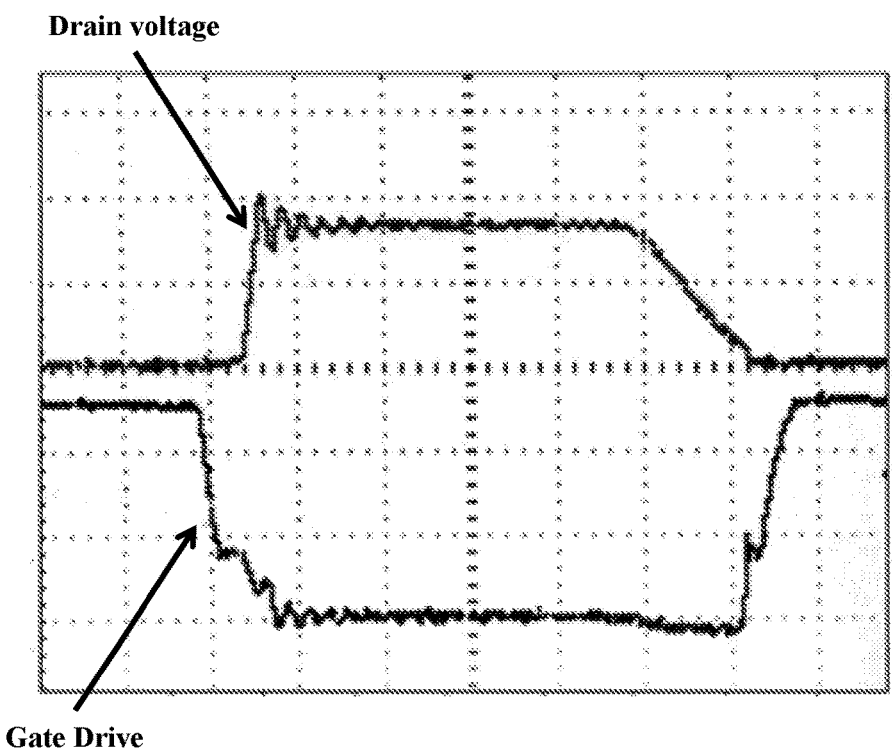
FIG. 3 depicts example observations and values, according to embodiments as disclosed herein.

The embodiments herein disclose systems for soft switching in single stage isolated flyback converters operating in boundary control mode, by incorporating a fixed dead time. Referring now to the drawings, and more particularly to FIGS. 1 through 3, where similar reference characters denote corresponding features consistently throughout the figures, there are shown preferred embodiments.

Embodiments herein disclose soft switching in Boundary Conduction (control) Mode (BCM) flyback converters taking advantage of parasitic elements. Embodiments herein disclose a methodology to achieve complete soft switching in an isolated BCM flyback converter for a variety of applications and line/load conditions. Embodiments herein incorporate a fixed dead time in a boundary conduction mode control scheme, which accomplishes the soft switching of the power devices.

Embodiments herein provide complete soft switching in isolated single stage BCM flyback converters with a single switch. Embodiments herein incorporate a fixed dead time in a boundary conduction mode control scheme, which enables total soft switching.

FIG. 1 depicts a circuit 100 for a flyback converter with an isolated low voltage output. The circuit 100 has a single output $V_O$ isolated from the input. The circuit 100, depicts a leakage inductance $L_1$ 102 (a parasitic element) and a capacitance $C_r$ 101. $C_r$ 101 comprises of capacitance of a switch SW 103, inter-winding capacitance of a transformer (T) 104, the junction capacitance of the diode $D_s$ 105, and an additional capacitor. $C_r$ 101 is connected across the switch SW 103. SW 103 is the main power switch and the ON and OFF time duration of the SW 103 regulates the output voltage across the capacitor Co 106. SW 103 is connected in series with the primary windings of T 104. In an embodiment herein, SW 103 can be at least one of a MOSFET switch, a bipolar transistor, and an insulated-gate bipolar transistor (IGBT). Embodiments herein are further explained considering that SW 103 is a MOSFET switch, but it may be obvious to a person of ordinary skill in the art that any other form of suitable switch may be used (such as a bipolar transistor, an IGBT, and so on). $L_p$ is the primary inductance of the transformer 104 comprising $N_p$ turns. $L_s$ is the secondary inductance of the transformer 104 with turns $N_s$. $D_s$ 105 is the secondary side rectifier. $D_s$ 105 is connected to the secondary windings of T 104.

A control IC can achieve boundary conduction control mode. Boundary conduction mode is detected with a separate sense winding in the transformer T 104, which generates a negative going edge (positive to negative transition) at the instance of secondary current falling to zero.

Since the converter is operating in the boundary conduction control mode, the turn ON current in the SW 103 is zero, which is a ZCS (Zero Current Switching) at turn ON. Also, the $D_s$ 105 turns OFF with ZCS and hence there is no reverse recovery issue with the diode $D_s$.

$C_r$ 101 absorbs the energy in the leakage inductance of the transformer 104, when SW 103 is turned OFF. This in turn enables avoidance of a dissipative turn OFF snubber. $C_r$ 101 also aids in achieving ZVS (Zero Voltage Switching), while the power switch (SW 103) is turned OFF. $C_r$ 101 resonates with the primary inductance $L_p$ and aids in securing ZVS at turn ON due to incorporation of adequate dead time.

The peak current ($I_{pp}$) of the SW 103 at the end of ON time $T_{on}$ for and BCM (Boundary Conduction Mode) will be $$I_{pp} = T_{on} * V_{in}/(L_p + L_1) \tag{1}$$

Consider a time period $t_0$ to $t_1$. Prior to $t_0$, SW 103 is ON for a period of $T_{on}$ and just at $t_0$, SW 103 is turned OFF. Stored energy in $L_p$ shall not immediately be transferred to output due to resonance between $L_p + L_1$ and $C_r$. The circuit is viewed as a series resonant circuit with initial current in inductance as $I_{pp}$ and initial voltage at $C_r$ as zero.

The excitation voltage is the input voltage $V_{in}$. $t_1$ is the instance at which drain voltage at SW 103 reaches maximum value and the current in the resonant circuit is zero. Under such conditions, instantaneous current in the circuit i(t) and the voltage at drain of SW 103, v(t) during $t_1$-$t_0$ interval can be written as $$i(t) = 0.5 * I_{pp} * (1 + \cos(\pi(t-t_0)/(t_1-t_0))) - 2 \sin(\pi(t-t_0)/(t_1-t_0)) \tag{2}$$

$$v(t) = 0.5 I_{pp} * \pi((L_p + L_1)/C_r) * (1 - \cos(\pi(t-t_0)/(t_1-t_0))) \tag{3}$$

Under unclamped conditions of a resonant circuit, the voltage across $C_r$ shall reach the maximum value of $$I_{pp} * \sqrt{((L_p - L_1)/C_r)} \tag{4}$$

However in the given flyback configuration when this voltage reaches a value, $$V\text{in} + (V_0/N_s) * N_p \tag{5},$$

the resonance stops because the output rectifier ($D_s$ 105) conducts and the stored energy in the primary of the transformer (T) 104 begins to flow to the load. This is the energy transfer phase to output load. However, at the primary side of the transformer T 104, the drain voltage continues to rise due to the energy stored in the leakage inductance because of $I_{pp}$. Since leakage inductance is orders lower than $L_p$, voltage at the drain, after reaching a higher peak value, settles down quickly to the value $$V_{in} + (V_0/N_s) * N_p \tag{6}$$

This peak voltage should be limited to a safe value well below the absolute maximum voltage of the switch SW 103.

The BCM is achieved with variable switching frequency. The switching frequency varies with line and load. Current in the secondary is sensed and the moment a zero current is detected during the SW OFF period, the primary switch (SW 103) is again turned ON.

If the turns ratio of the transformer (T 104) is so chosen that the reflected voltage at the primary is at least equal to $V_{inmax}$ (Vinmax is the highest input range), during the energy transfer phase, then the duty cycle (D) is 0.5 at $V_{inmax}$ input. For any other input voltage Vin, $$D = V_{inmax}/(V_{in} + V_{inmax}) \tag{7}$$

Average current in the primary turns of the transformer (T) 104 is $$I_p \text{avg} = I_{pp} * 0.5 * D \tag{8}$$

The average current in the secondary turns of the transformer (T) 104, which is same as load current $I_L$ is given by $$I_L = I_{sp} * 0.5 * (1 - D) \tag{9},$$

where $I_{sp}$ is the peak secondary current.

The turns ratio of transformer (T) 104 is selected in such a way that the reflected voltage at the primary is at least equal to highest input voltage, while the secondary diode $D_S$ 105 is conducting. This ensures sufficient energy to be stored in the $C_r$ 101, which will drive the ZVS condition at turn ON.

A fixed dead time is introduced before turning ON the SW 103. The dead time should be equal to the half of resonant time period of primary inductance $L_p$ and $C_r$ 101.

The voltage at $C_r$ 101 will be at least equal to twice the input voltage, when $D_s$ 105 is conducting. Once the stored energy in T 104 is fully delivered to the load, $D_s$ 105 turns OFF with zero current. Then, the primary circuit can be considered as a resonant LC circuit with initial current in $L_p$ as zero and voltage at $C_r$ 101 as at least twice the input voltage. The energy in $C_r$ 101 initially is transferred to the primary inductance till $C_r$ 101 voltage reaches the input voltage. Subsequently, the energy in the primary inductance starts discharging $C_r$ 101 down to zero value.

This is the favorable time to turn ON SW 103, which realizes the ZVS. Thus if a delay/dead time is added to the instance of detection of zero current and then allow the SW 103 to turn ON, in the boundary control scheme and the delay/dead time being equal to half the resonant time of primary inductance and $C_r$ 101 then, total soft switching is achieved.

FIG. 2 depicts the timing sequence of the scheme. The timing sequence can be divided in to time intervals and explained as under:

$T_0$-$T_1$: Prior to $T_0$, the power switch SW 103 is OFF and at $T_0$, the SW 103 is turned ON. Since the converter 100 is in boundary control mode, the initial turn ON current is zero and hence ZCS at turn ON. The primary current linearly ramps up. This mode ends at $T_1$ when the switch 103 is turned OFF. This period is same as $T_{on}$.

$T_1$-$T_2$: Because of $C_r$ 101, the voltage across SW 103 is held at zero value at $T_1$ achieving ZVS at turn OFF. The current in the primary windings of T 104 is diverted to $C_r$ 101 and resonance starts between $L_p$ and $C_r$ 101. This mode ends at $T_2$ when the drain voltage of SW 103 reaches a value $V_{in} + (V_0/N_s) * N_p$. Neglecting the leakage inductance effect, drain voltage settles to $V_{in} + (V_0/N_s) * N_p$ and the energy stored in the primary windings of T 104 begins to flow to the secondary windings of T 104.

$T_2$-$T_3$: This is an energy transfer phase and is equal to $T_{off}$.

$T_3$-$T_4$: This period is equal to half the dead time designed and at $T_3$, the secondary current has fallen to zero value. The drain voltage of SW 103 is at $V_{in} + (V_0/N_s) * N_p$ and the resonance starts again between $L_p$ and $C_r$ 101. The initial current in the resonant circuit is zero. Energy stored in $C_r$ 101 at $V_{in} + (V_0/N_s) * N_p$ voltage is initially transferred to $L_p$ and the voltage at $C_r$ 101 reduces sinusoidally. This mode ends at $T_4$ when the $C_r$ 101 voltage reaches $V_{in}$.

$T_4$-$T_5$: Since the voltage across $L_p$ reaches to zero value at $T_4$, the current in $L_p$ tries to remain constant by circulating in the $V_{in}$ and $C_r$ circuits. However since the $C_r$ 101 is not a voltage source, its voltage starts reducing sinusoidally and reaches a value zero at $T_5$. The duration of $T_5$ to $T_4$ is equal to half the dead time designed and hence SW 103 turns ON again at $T_5$, achieving ZVS at turn ON. Thus total soft switching is achieved for the SW 103. $T_5$ and $T_0$ are the same. The time gap between $T_5$ to $T_3$ is the designed dead time equal to half the resonant time of $L_p$ and $C_r$.

The following section details computation of component values for a practical 100 W flyback converter to achieve complete soft switching in the BCM.

Input voltage: 200 to 400 VDC

Output voltage: 135 VDC
Output Current: 0.75 Amps.
MOSFET switch SW should have at least 1000V breakdown capacity.
Assuming an efficiency of 90%, the average input current is 0.37 Amps at an input of 300 VDC.
In the boundary mode control, as stated in equation (7)
The duty cycle at 300V DC is equal to 0.57,
Hence, the primary peak current is $$I_{pp}=0.37*2/0.57=1.3 \text{ Amps.}$$

From the data sheet of the MOSFET, the turn off time $t_{off}$ is about 50 nS. Therefore, if the rise of drain voltage to its final value is delayed by $t_{off}$, zero voltage switching at turn OFF can be achieved. Hence the value of $C_r$ 101 can be arrived as $$C_r = I_{pp}*t_{off}/700V = 93 \text{ pF, choose 100 pF} \qquad (10)$$

Turns ratio of the transformer is $$N = N_p/N_s = 400/135 = \sim 3.0 \qquad (11)$$

Peak current in secondary is $$I_{sp} = 1.3*3 = 3.9 \text{ Amps} \qquad (12)$$

Fixing a maximum frequency as 125 KHz at the maximum input voltage and fixing a duty cycle of 0.5 and ON time $T_{on}$ is 4 μS.
Peak input current at maximum input voltage is 1.12 Amps. Therefore, Primary inductance $L_p$ is computed as $$L_p = 400*4*10^{-6}/1.12 = 1.43 \text{ mH} \qquad (13)$$

The delay time required to be incorporated after detecting boundary conduction mode is $$\pi*\sqrt{(1.43*10^{-3}*100*10^{-12})} = 1.16 \text{ μS} \qquad (14)$$

The design values arrived are
$L_p$=1.43 mH
$C_r$=100 pF
Delay time=1.16 μS
Maximum switching frequency=125 KHz.
Switching frequency at minimum input voltage $V_{inmin}$ and full load is 55.5 KHz.

With the above values, a flyback converter was built and evaluated. The observed gate and drain waveforms of the switch SW 103 representing in FIG. 3b, clearly depicting ZVS at turn ON and OFF.

Embodiments disclosed herein can be used for a variety of applications including power factor correction. Single stage isolated converters with active PFC are best suited for low and medium power applications. In such configuration, Boundary Conduction Mode flyback converters are widely used and many control ICs are commercially available. The high voltage input filter capacitor is eliminated and hence there is no inrush current, obviating the need for associated protection circuit. In such a scheme, embodiments herein achieve soft switching to further enhance the efficiency. Consider an example application, wherein a flyback converter with PFC was built adapting the BCM. Subsequently, a fixed dead time was introduced after detecting zero current in the transformer before turning ON the power switch. This achieved the total soft switching for the MOSFET. Embodiments disclosed herein can be used in applications such as -LED street lights, automotive, earth moving equipment lamps, LED drivers, bias converters, heating elements, fan supplies, FHP motors, and so on.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. A flyback converter (100) operating in a Boundary Conduction Mode (BCM) with Direct Current (DC) input, wherein the flyback converter comprising:
   a switch (SW) (103) connected to primary windings of a transformer (T) (104), wherein ON and OFF periods of the switch (SW) (103) regulate an isolated output voltage across a capacitor (Co) (106);
   a capacitor ($C_r$) (101) connected across the switch (SW) (103);
   a diode ($D_s$) (105) connected to secondary windings of the transformer (T) (104), wherein a control input to the switch (SW) (103) comprises a fixed dead time in the Boundary conduction Mode (BCM), wherein the fixed dead time is introduced after detecting zero current in the secondary windings of the transformer (T) (104) while the switch (SW) (103) is in OFF state and before turning ON the switch (SW) (103), wherein a turns ratio of the transformer (T) (104) is selected such that the reflected voltage at primary windings of the transformer (T) (104) is at least equal to highest DC input voltage, while the diode ($D_s$) (105) is conducting.

2. The flyback converter, as claimed in claim 1, wherein the switch (SW) (103) is at least one of a MOSFET switch, a bipolar transistor, and an insulated-gate bipolar transistor (IGBT).

3. The flyback converter, as claimed in claim 1, wherein the switching frequency associated with the BCM varies with line and load.

4. The flyback converter, as claimed in claim 1, wherein the capacitor ($C_r$) (101) absorbs the energy in the leakage inductance of the transformer (T) (104).

5. The flyback converter, as claimed in claim 1, wherein the capacitor ($C_r$) (101) resonates with primary inductance of the transformer (T) (104).

6. The flyback converter, as claimed in claim 1, wherein the fixed dead time is equal to the half of resonant time period of the primary inductance of the transformer (T) (104) and the capacitor ($C_r$) (101).

7. The flyback converter, as claimed in claim 1, wherein voltage at the capacitor ($C_r$) (101) is at least equal to twice the input voltage, when the diode ($D_s$) (105) is conducting.

8. The flyback converter, as claimed in claim 1, wherein the BCM is detected with a separate sense winding in the transformer (T) (104) that generates a negative going edge at an instance of secondary current falling to zero.

9. The flyback converter, as claimed in claim 1, wherein combination of the fixed dead time and selection of the turns ratio of the transformer (T) (104) achieves soft switching in the flyback converter.

* * * * *

UNITED STATES PATENT AND TRADEMARK OFFICE
CERTIFICATE OF CORRECTION

PATENT NO. : 10,211,742 B2
APPLICATION NO. : 15/794960
DATED : February 19, 2019
INVENTOR(S) : Vangala et al.

Page 1 of 1

It is certified that error appears in the above-identified patent and that said Letters Patent is hereby corrected as shown below:

On the Title Page

Item (72) Inventor is corrected to read:
-- Nagesh Vangala, Bangalore, (IN);
Rayudu Mannam, Bangalore, (IN);
Srinivasa Rao Gorantla, Guntur, (IN) --.

Signed and Sealed this
Thirtieth Day of July, 2019

Andrei Iancu
*Director of the United States Patent and Trademark Office*